United States Patent [19]
Miller et al.

[11] Patent Number: 6,079,441
[45] Date of Patent: Jun. 27, 2000

[54] ADJUSTABLE ELECTRONIC POSITION INDICATOR APPARATUS

[75] Inventors: Roy D. Miller, Lancaster; Wayne R. Houck, Columbia; Ronald G. Butler, Mountville; John R. Lehman, Maytown, all of Pa.

[73] Assignee: ITT Manufacturing Enterprises, Inc., Wilmington, Del.

[21] Appl. No.: 08/833,212

[22] Filed: Apr. 14, 1997

[51] Int. Cl.[7] .................................................. F16K 37/00
[52] U.S. Cl. ........................................ 137/554; 236/93 R
[58] Field of Search .......................... 137/554; 236/93 R; 70/176, 177, 178, DIG. 10

[56] References Cited

U.S. PATENT DOCUMENTS

| | | |
|---|---|---|
| 2,678,661 | 5/1954 | Roper et al. ........................ 137/554 X |
| 4,926,903 | 5/1990 | Kawai ..................................... 137/554 |
| 5,027,853 | 7/1991 | Walko et al. ........................... 137/554 |
| 5,098,063 | 3/1992 | Ronzon ................................... 137/554 |
| 5,154,206 | 10/1992 | Gillott et al. ........................... 137/554 |
| 5,269,343 | 12/1993 | Trapp ...................................... 137/554 |
| 5,462,226 | 10/1995 | Randall et al. ....................... 236/93 R |
| 5,564,470 | 10/1996 | Denmark et al. ...................... 137/554 |

Primary Examiner—John Rivell
Attorney, Agent, or Firm—M. J. Lombardi

[57] ABSTRACT

An apparatus for providing indication of valve position of a manual valve is disclosed for a valve having a rotary, operating assembly journaled in a housing, the operating assembly comprising a handwheel, a bushing fastened to the handwheel, and a spindle threadedly engaged to the bushing to cause translation of the spindle in response to rotation of the handwheel and the bushing, the apparatus for enclosure in the housing comprising a hub coupled to the bushing for transmitting rotary motion in response to rotation of the bushing; translation means for translating the rotary motion into an electrical signal; and circuitry means responsive to the electrical signal for indicating position of the valve.

12 Claims, 12 Drawing Sheets

ADJUSTABLE ELECTRONIC POSITION INDICATOR APPARATUS

FIELD OF THE INVENTION

The present invention relates to valves and in particular, to electronic devices for indicating relative valve position and for adjusting the opening stop and lockout positions for a manual valve.

BACKGROUND OF THE INVENTION

Many valves, so-called point-of-use valves, used in pharmaceutical piping applications, are valves which are operated manually. Because systems in which these valves are used are periodically sterilized with steam, resulting in safety concerns for valve operators, and because many systems are now required to know the position of valves at all times, great emphasis is placed on indicating the valve position of manual valves, and on providing automatic means for correctly locating and locking out the relevant valves without manual intervention. A temperature-responsive locking mechanism for a manual valve is described in commonly assigned U.S. Pat. No. 5,462,226 issued Oct. 31, 1995, Temperature-Responsive, Locking Mechanism For, And In Combination With, A Fluid Valve, incorporated herein by reference. Until now, two methods have primarily been used to indicate valve position on a manual valve. In the first method, visual indication is used to identify whether a valve is open or closed. Here, bright colors are attached to a part of the valve which moves as the valve is opened or closed in order to identify what position the valve is in. This mechanical method, however, does not provide an operator precise knowledge of the valve position as the valve strokes, other than whether the valve is fully open or fully closed. Under the second method, electronic signals are sent to a programmable logic controller or digital control system by means of a mechanical or proximity switch located at either the open position, the closed position, or at each position to indicate the valve state. For mechanical switches, the switch sends a signal when it is tripped; proximity switches transmit a signal corresponding to an open or closed valve position when a conductor moves into the switch sensing area. This method also suffers the disadvantage of being unable to indicate continuous valve position as the valve strokes. Moreover, standard switches cannot limit the opening of a manual valve, but only provide an electrical output indicating that the valve is open or closed. In addition, because manual valves are often located in environments either open to the natural elements such as rain and snow, or requiring regular washdowns such as in a sanitary facility, a switch cannot simply be attached to the exterior of a manual valve, but must be located in a NEMA (National Electrical Manufactures Association) enclosure. A terminal connection must be used to provide electrical power to the switch, also in the NEMA enclosure, thus making the switch even larger and more difficult to attach to a valve.

Consequently, a compact means for providing an indication of valve position throughout the entire valve stroke, for providing an electronic manual override of a locked valve, and for preventing a valve from fully opening at any position throughout the valve stroke is greatly desired.

SUMMARY OF THE INVENTION

It is an object of this invention to provide an improved electronic valve position indicator apparatus for indicating the position of a manual valve throughout the valve stroke.

It is a further object of this invention to provide an improved electronic valve position indicator apparatus enclosed in a NEMA housing that can provide indication of valve open/closed anywhere throughout the valve stroke and is selectably adjustable.

Another object of this invention to provide an improved electronic valve position indicator apparatus providing adjustable indication of valve open/closed anywhere throughout the valve stroke and that can act as a stop to prevent the valve from fully opening.

Still another object of this invention to provide an improved electronic valve position indicator apparatus having selectable electrical output characteristics for meeting specific controller and output electronics requirements.

It is an object of this invention to disclose an apparatus for providing indication of valve position for a valve having a rotary, operating assembly journaled in a housing, the operating assembly comprising a handwheel, a bushing fastened to the handwheel, and a spindle threadedly engaged to the bushing to cause translation of the spindle in response to rotation of the handwheel and the bushing, the apparatus for enclosure in the housing comprising a hub coupled to the bushing for transmitting rotary motion in response to rotation of the bushing; translation means for translating the rotary motion into an electrical signal; and circuitry means responsive to the electrical signal for indicating position of the valve.

Further objects of this invention, as well as the novel features thereof, will become apparent by reference to the following description, taken in conjunction with the accompanying figures.

BRIEF DESCRIPTION OF THE DRAWINGS

A complete understanding of the present invention may be gained by considering the following detailed description in conjunction with the accompanying drawing in which.

DETAILED DESCRIPTION OF THE INVENTION

Figure 1:
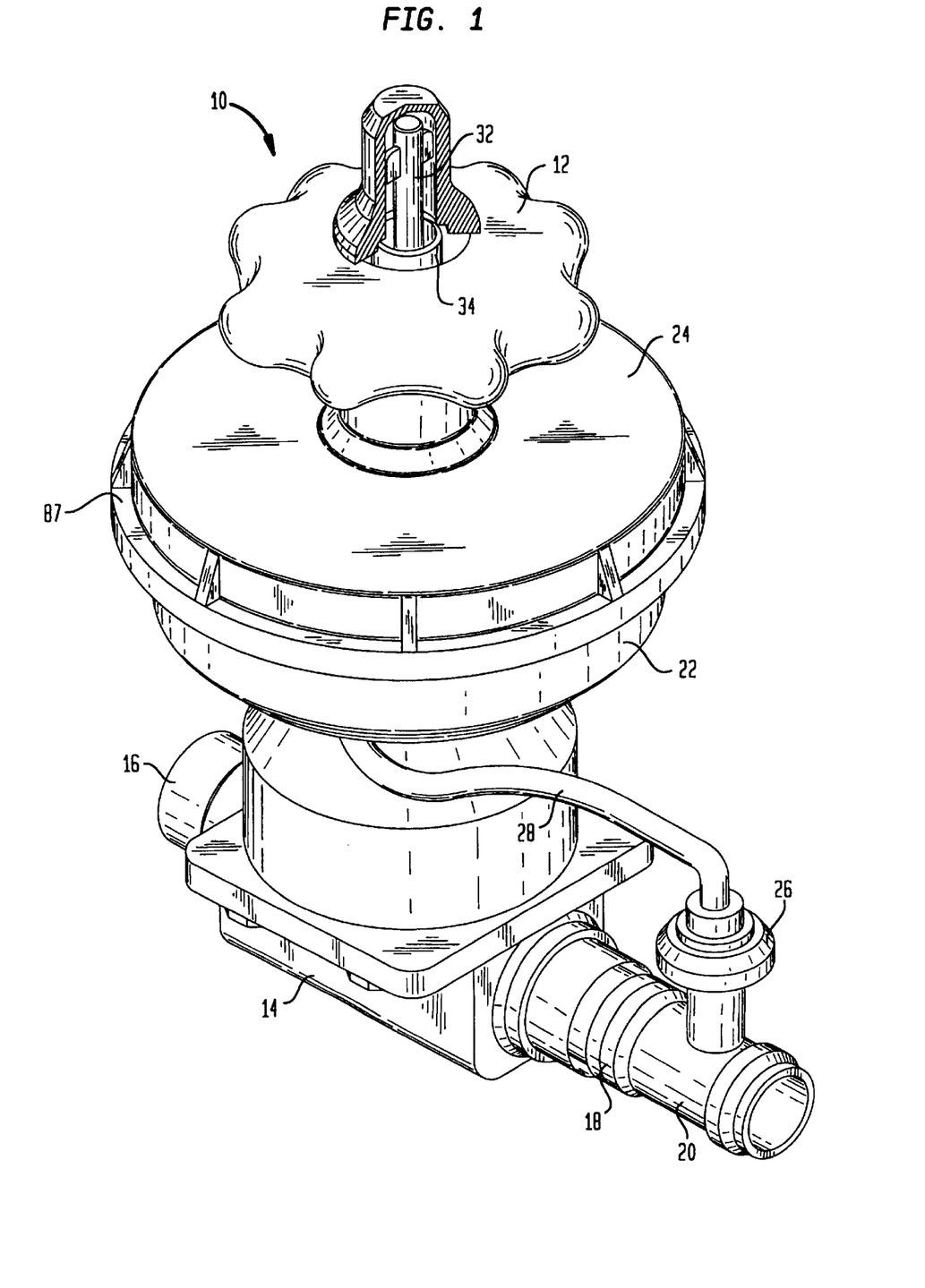
FIG. 1 shows a view of the handwheel valve which incorporates the embodiment of the invention therein.

FIG. 1 illustrates a fluid control valve 10, operative by a handwheel 12, the valve 10 having a valve body 14, an outlet flange 16 and an inlet flange 18. A tee-shaped tube 20 is connected to the inlet flange 18. Between the body 14 and the handwheel 12 is a housing 22 in which are confined components of a temperature-responsive locking mechanism 24 and an electronic valve position indicator apparatus 87. A fluid-temperature-operated switch 26 is mounted onto tube 20 for actuation in response to a given temperature of fluid flow through the tube 20 and valve body 14. An electrical conduit 28 electrically connects switch 26 to an electronic circuit board 88 provided therefor in the housing. An end of a spindle 32 projects from the handwheel 12, and a portion of a spindle-enclosing bushing 34 is shown circumadjacent spindle 32.

Figure 2:
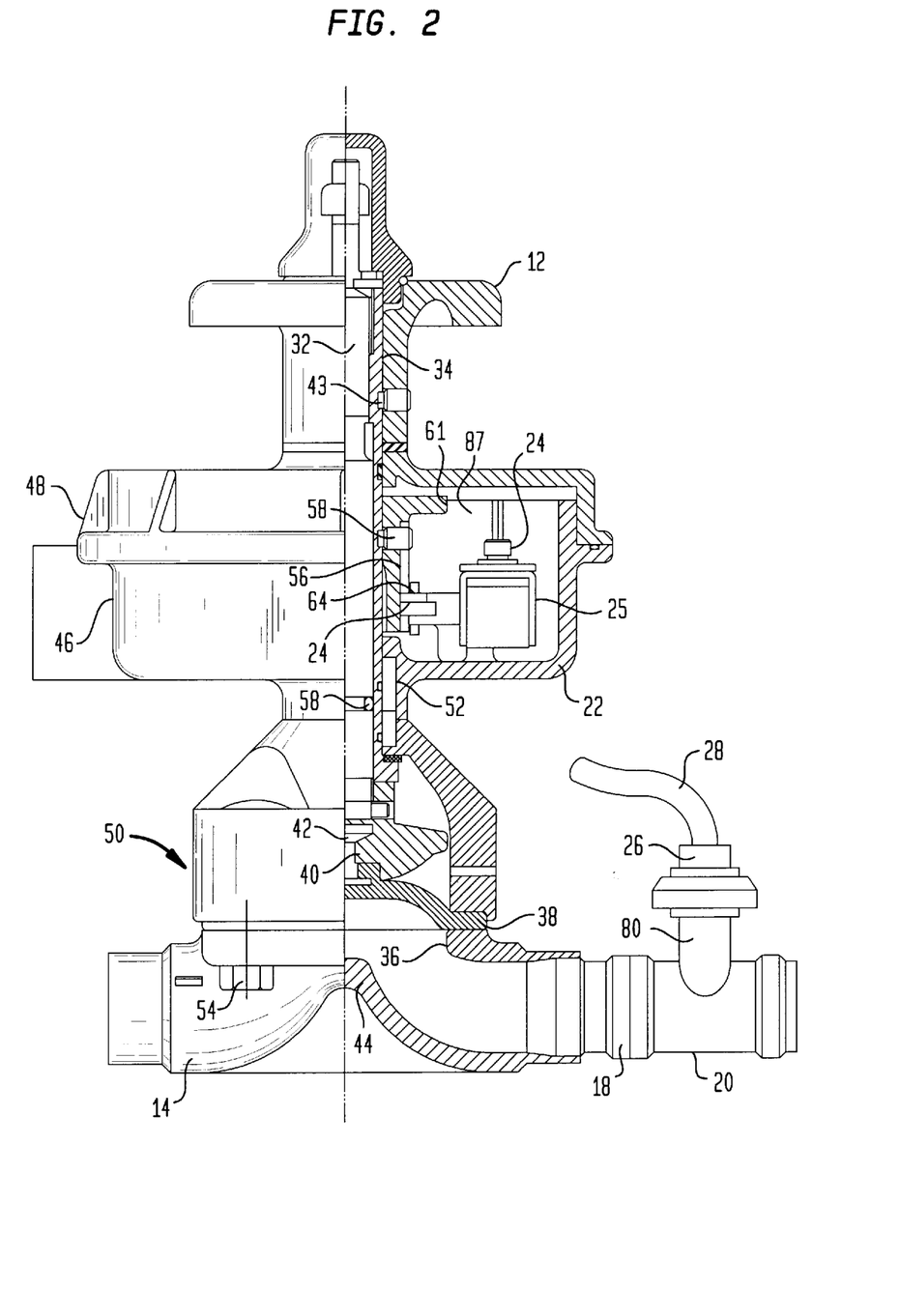
FIG. 2 is an elevational view of FIG. 1, half of the illustration being axially cross-sectioned.

The cross-sectional view in FIG. 2 shows the body 14 to have an opening 36 formed therein and, as shown, the opening is closed off by a flexible diaphragm 38. The diaphragm 38 is held against the opening by a compressor 40. A pin 42 fixes the compressor 40 to the spindle 32. An upper end of the spindle 32 is externally threaded and, thereat, threadedly engages internal threads formed on the bushing 34. A set screw 43, in penetration of the handwheel 12, fixes the handwheel to the bushing 34. Consequently, with rotation of the handwheel 12, the spindle 32 is caused to translate, and move the compressor 40 and the thereat-tached diaphragm 38 from or toward the opening 36. Within the opening 36 is a weir 44. The diaphragm 38, upon having closed against the weir 44, prevents fluid flow through the body 14. The diaphragm 38 must be removed from the weir 44 before flow can pass through the tube 20 and the body 14, and out the opposite end of the body, i.e., via outlet flange 16.

The housing 22 has a base 46 which serves as a platform for components of the locking mechanism 24 and the electronic valve position indicator apparatus 87, and a cover 48. The housing is joined to the bonnet by pins 52 and the bonnet 50 is fastened to the body 14 by hardware 54.

Figure 3:
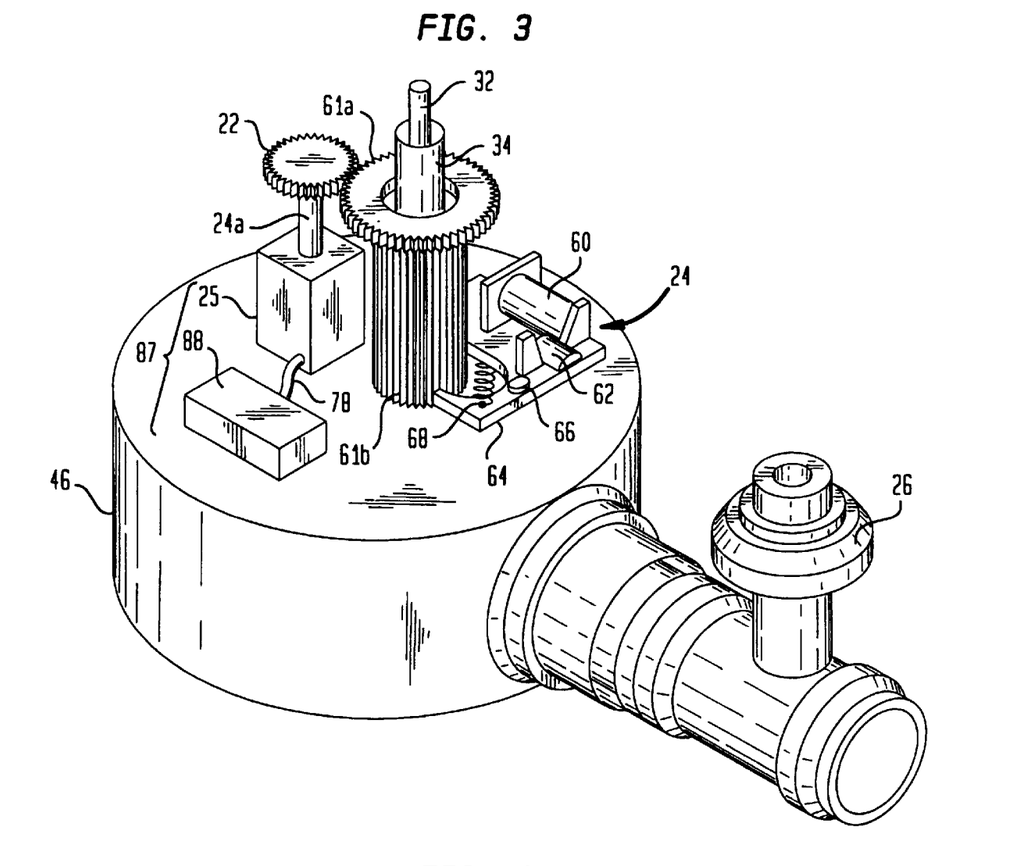
FIG. 3 is a perspective depiction of the housing.

FIG. 3 better illustrates the housing-confined components of the electronic valve position indicator apparatus 87 and locking mechanism 24. Therein it can be seen that an annular hub 61 is set about the bushing 34 and secured thereto by a set screw 58 (shown in FIG. 2). The hub 61 has an upper portion 61a in toothed engagement with potentiometer gear 22, which is secured to multi-turn potentiometer 25 by a set screw 24a, and a lower ratchet portion 61b for potential engagement with locking mechanism 24. Mounted on the base 46 is a solenoid 60. The stroking rod 62 of the solenoid 60 is pivotably coupled to one end of a pawl 64. The pawl 64 is pivotably mounted to the base 46 by a shoulder bolt 66. An extension spring 68, fixed at one end to the base 46, and to the pawl 64 at the other end thereof urges the pawl into engagement with the ratchet portion 61b of hub 61.

Figure 4:
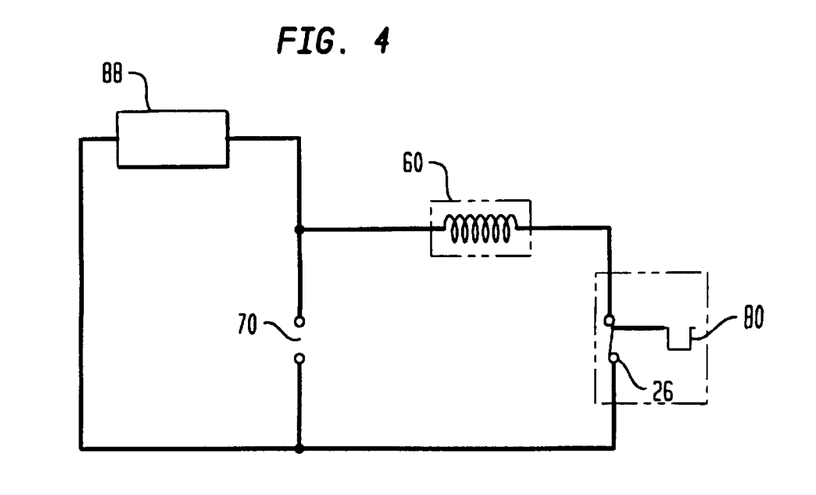
FIG. 4 is a schematic diagram of the electrical circuitry of the thermal switch and solenoid.
Figure 5:
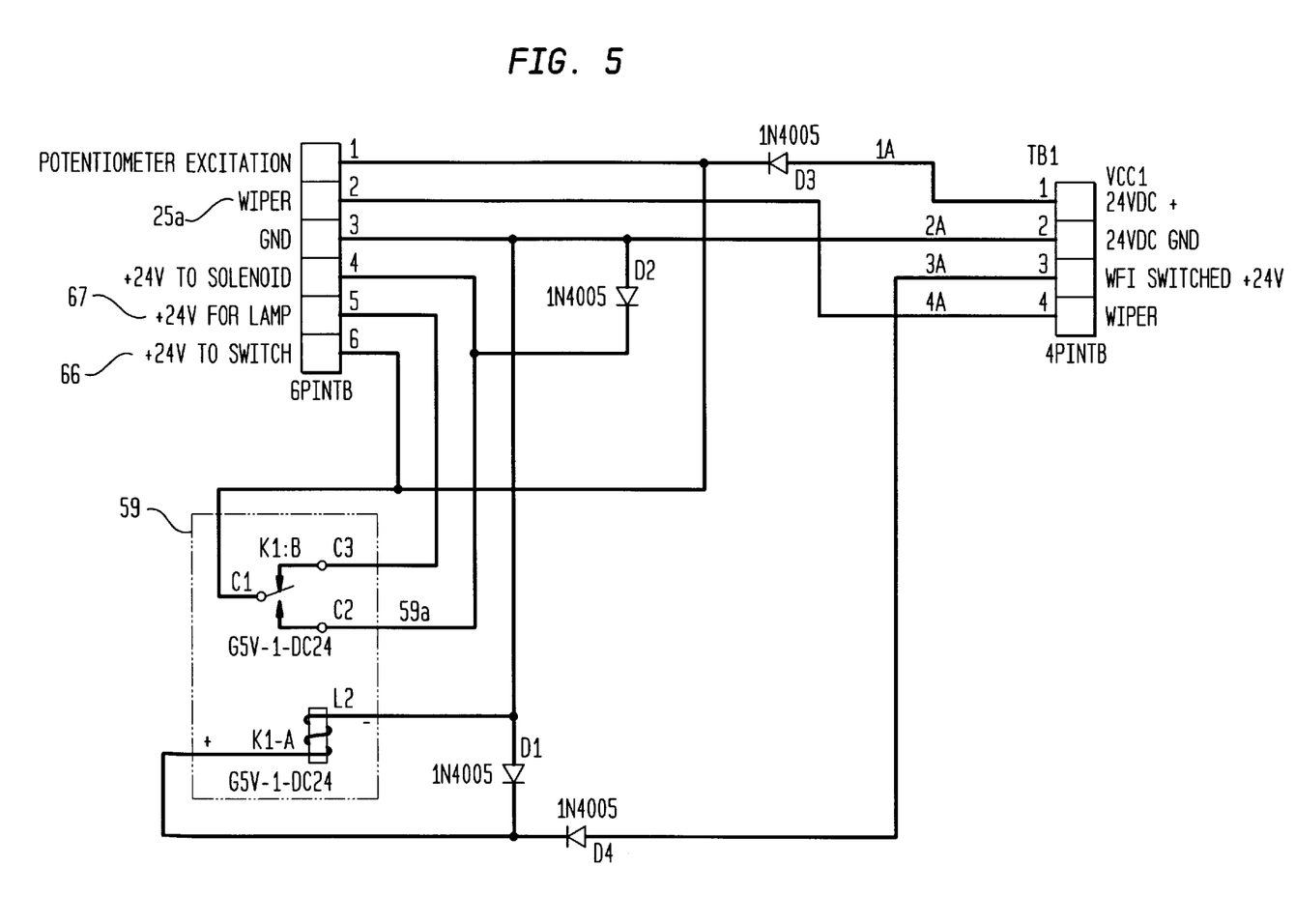
FIG. 5 is a schematic diagram of a circuit formed on a circuit board.

As represented in FIG. 4, a source 70 of electric power is connected to the solenoid 60 and to the thermal switch 26. The circuits illustrated in FIGS. 5, 6, and 7 were found to provide satisfactory operation using the numeric values indicated for each labeled component and are given only by way of example. Source 70 is also connected to electronic circuit board 88 mounted to the base 46. Disposed on electronic circuit board 88 is an electronic circuit 88c as illustrated in FIGS. 5 and 8C having a terminal board 1 (tb1) with connector 1 coupled to source 70. Thermal switch 26 is coupled to electronic circuit board 88 at tb1 connector 3. As illustrated in FIG. 4, the temperature switch 26 is normally closed and, consequently, the solenoid is energized. As illustrated in FIG. 5, when temperature switch 26 is closed, power is supplied at tb1 connector 3. Voltage supplied at the positive terminal of coil element K1A of relay 59 induces element K1B to switch from normally closed position c1–c3 to energized position c1–c2, thereby energizing solenoid 60 over line 59a. Therefore, the pawl 64 is withdrawn from hub ratchet portion 61b and the valve 10 is unlocked. When valve 10 is unlocked, one can use the handwheel 12 to open or close the valve 10 at will. As the valve handwheel 12 is turned, the bushing 34 rotates. Hub 61, in lock step with bushing 34, also rotates, thereby transmitting rotary motion to potentiometer gear 22, resulting in either an increase or decrease in resistance of, and hence voltage across, wiper 25a of potentiometer 25, depending on the direction of rotation. For illustrative purposes, full counterclockwise rotation causes valve 10 to become full open, whereby the wiper voltage is minimized. Conversely, full clockwise rotation causes valve 10 to become full closed, thereby maximizing the voltage across wiper 25a. Wiper 25a of potentiometer 25 is coupled to electronic circuit board 88c over terminal strip 78 at terminal board 3 (tb3) connector 2, as illustrated in FIGS. 3, 5, and 8C. Power supply voltage Vcc1 supplied at tb1 connector 1 over line 1a energizes potentiometer 25 at tb3 connector 1. Potential ground is applied at tb1 connector 2 and tb3 connector 3 over line 2a. Therefore, as the valve 10 is turned in a clockwise fashion toward a closed position, bushing 34 rotates in the same direction, causing hub 61 to rotate. As hub 61 rotates, the upper portion 61a in toothed engagement with potgear 22 results in rotation of the potgear, causing a change (increase) in resistance and hence voltage increase across wiper 25a proportional to the degree of valve rotation. The voltage signal Vf is applied at tb3 connector 2 and fed over line 4a to tb1 connector 4 for transmission to a controller (not shown). Similarly, as valve 10 is rotated in a counterclockwise direction toward an open position, hub 61 rotates in the opposite direction, causing a change (decrease) in resistance and hence voltage decrease across wiper 25a proportional to the degree of valve rotation in the opposite direction. Since the voltage signal Vf at tb1 connector 4 fluctuates in magnitude proportional to the direction and degree of valve rotation, the apparatus thereby provides a continuous indicator of the position of the valve throughout the entire valve stroke.

As previously mentioned, the valve 10 is free to move when the temperature switch 26 is closed. However, when temperature sensing probe 80 exposed to the subject fluid reaches a set temperature, switch 26 opens, thereby opening the circuit illustrate in FIG. 4 and de-energizing solenoid 60. The solenoid rod 62 advances and, with the urging of the spring 68, the pawl pivots into ratchet portion 61b of hub 61. The valve 10 is then prevented from opening. As illustrated in FIG. 5, opening thermal switch 26 causes relay coil 59 to close to normally closed position c1–c3, thereby applying a voltage signal at tb3 connector 5 to light lamp 67, indicating a "hot condition" of the valve. Diodes D3 and D4 act as reverse polarity protectors, while diodes D1 and D2 are surge protectors to absorb any spike conditions. The valve can be closed, but it cannot be opened. A novel override feature of the present invention allows for manual override of the lock, thereby permitting further opening of the valve 10. Selection of normally open override switch 66 electrically coupled to tb3 connector 6 and to power source 70 at tb1 connector 1 generates power supply voltage at tb3 connector 4 as illustrated in FIG. 8c, thereby energizing solenoid 60. As solenoid 60 is energized, rod 62 displaces pawl from hub ratchet portion 61b, thereby disengaging locking mechanism 24.

Figure 6A:
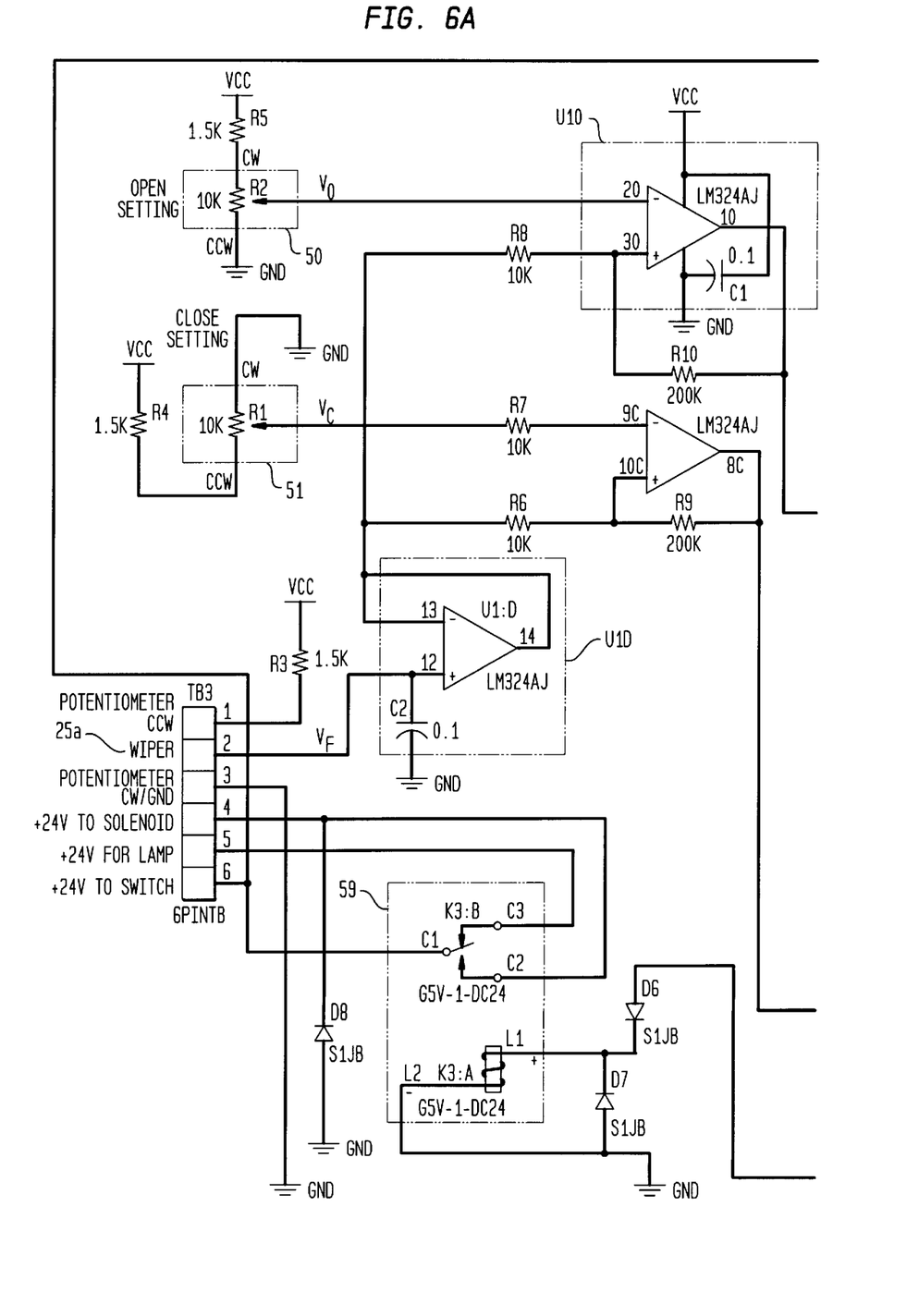
FIG. 6 is a schematic diagram of another embodiment of a circuit formed on a circuit board.
Figure 6B:
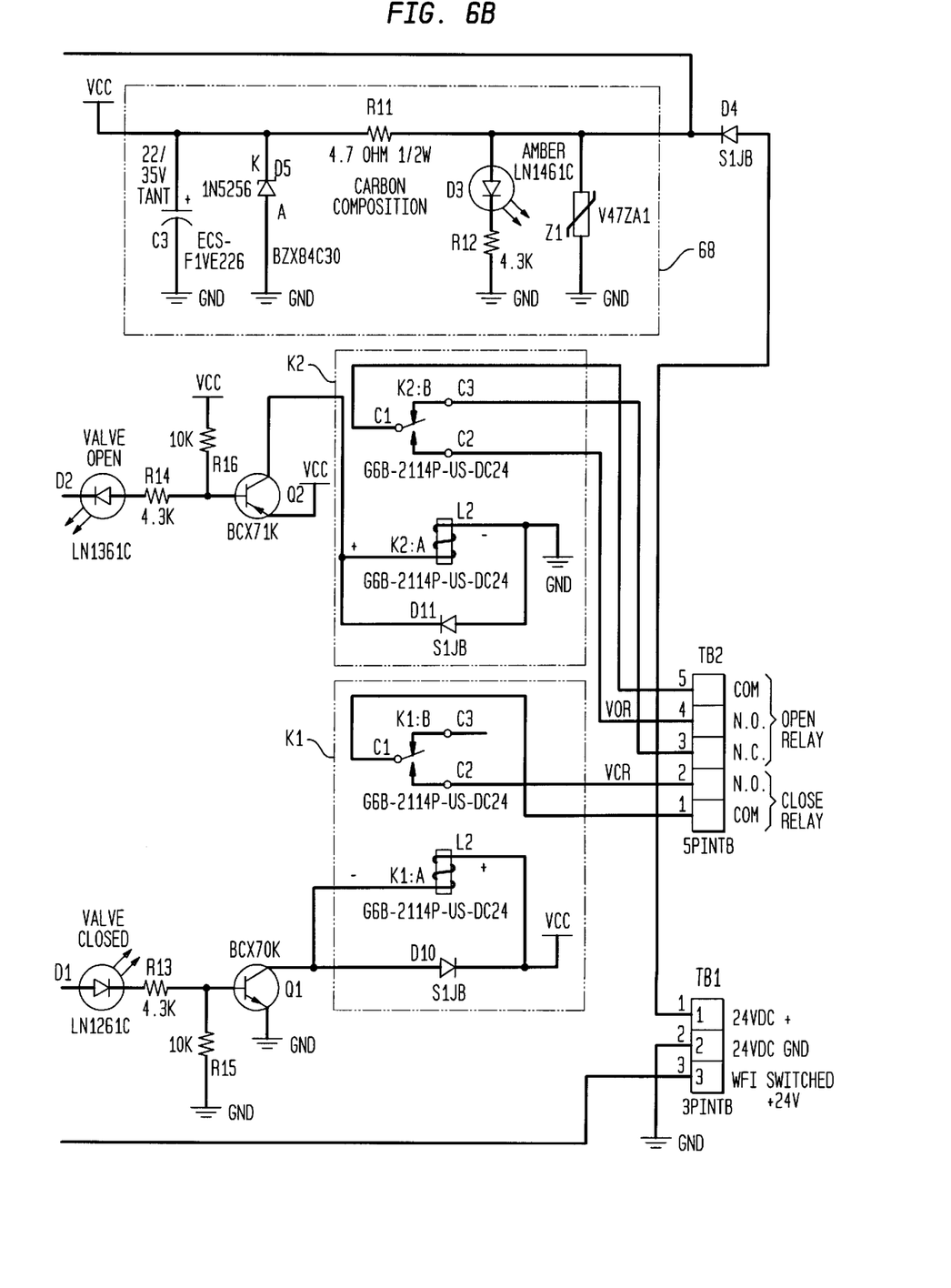
Figure 8A:
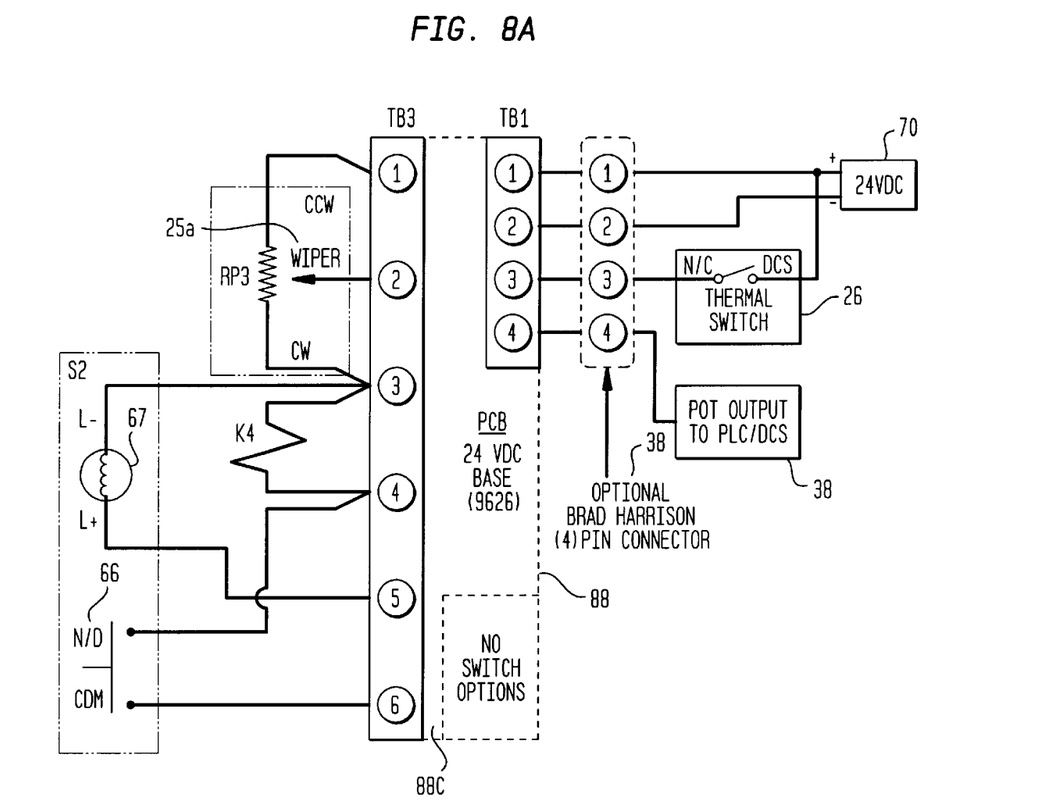
FIGS. 8A–8F illustrate pin connections of embodiments of circuits formed on a circuit board.
Figure 8B:
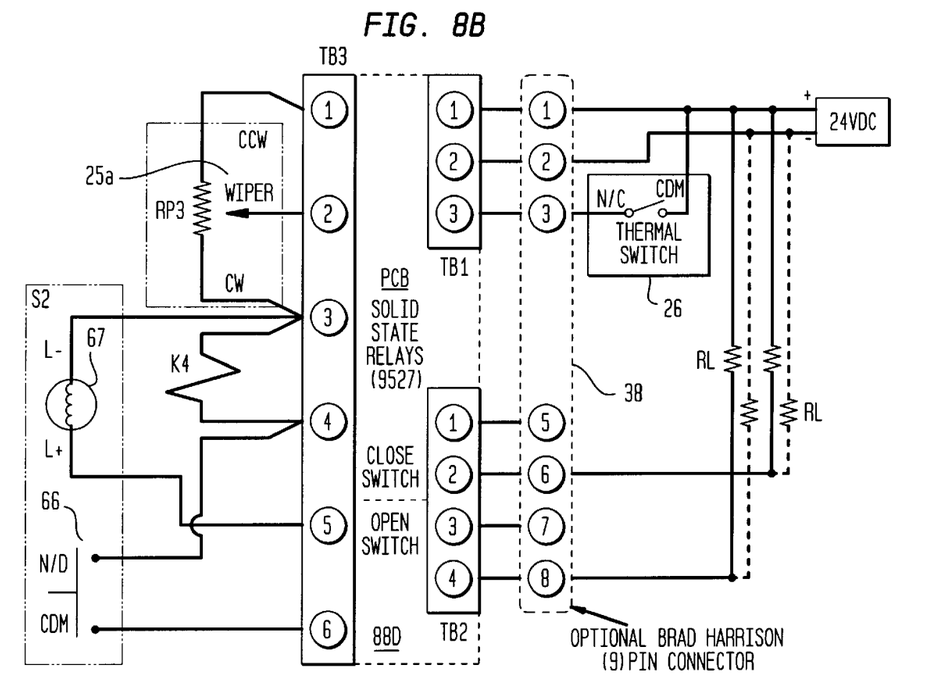
Figure 8C:
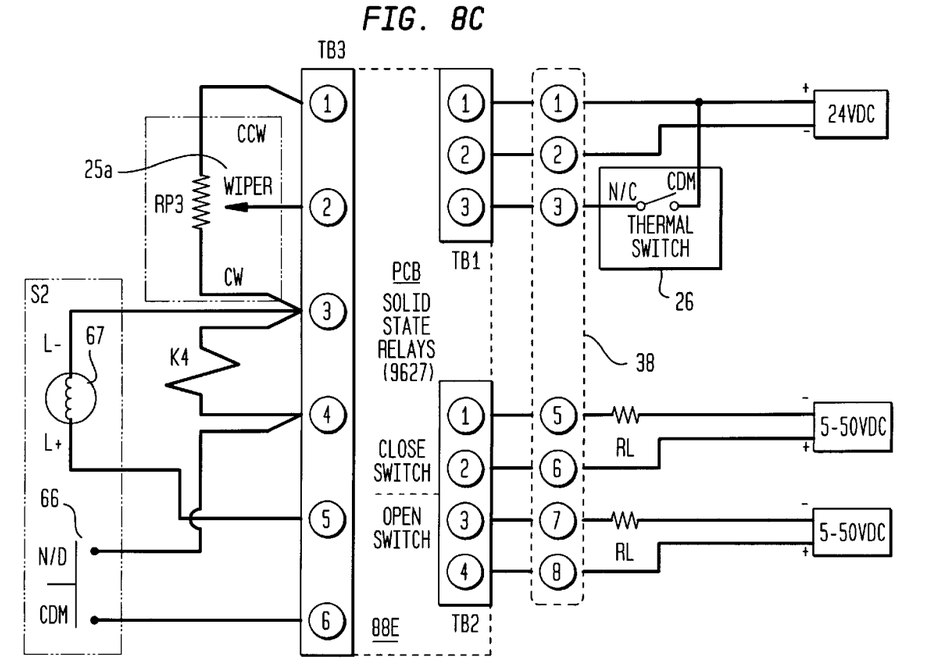
Figure 8D:
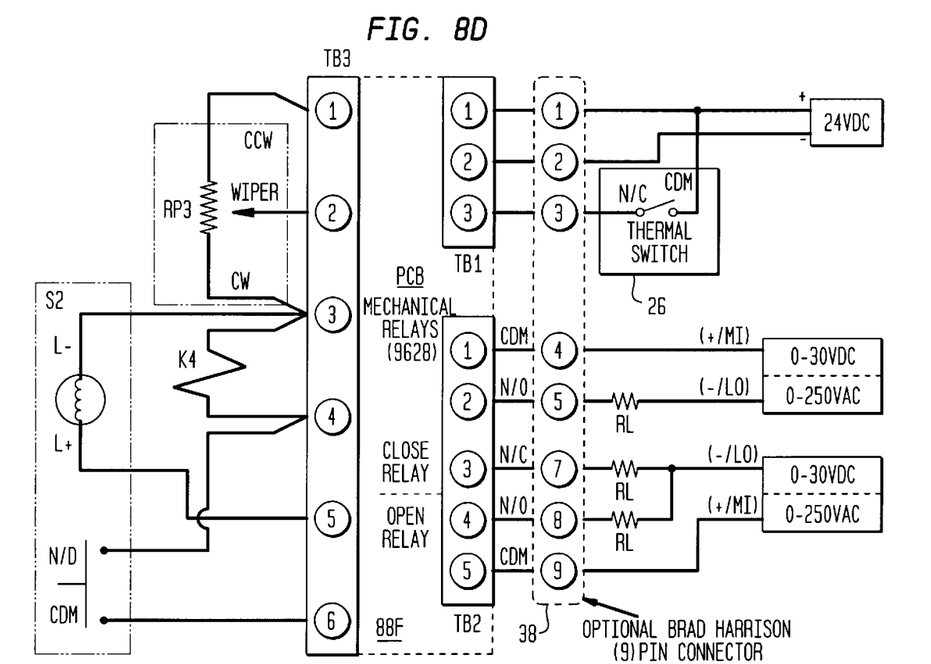
Figure 8E:
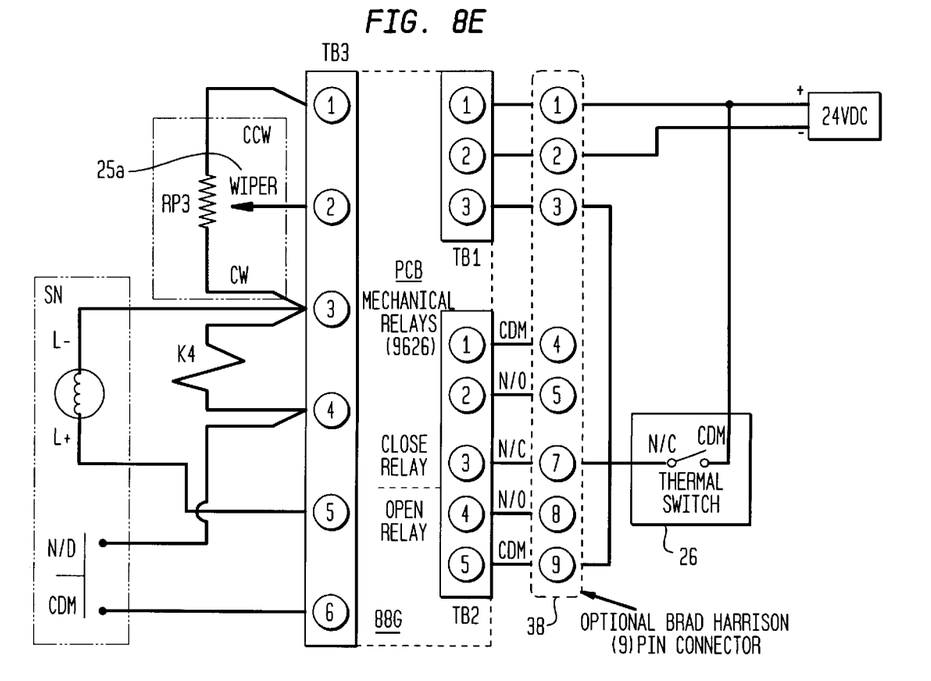
Figure 8F:
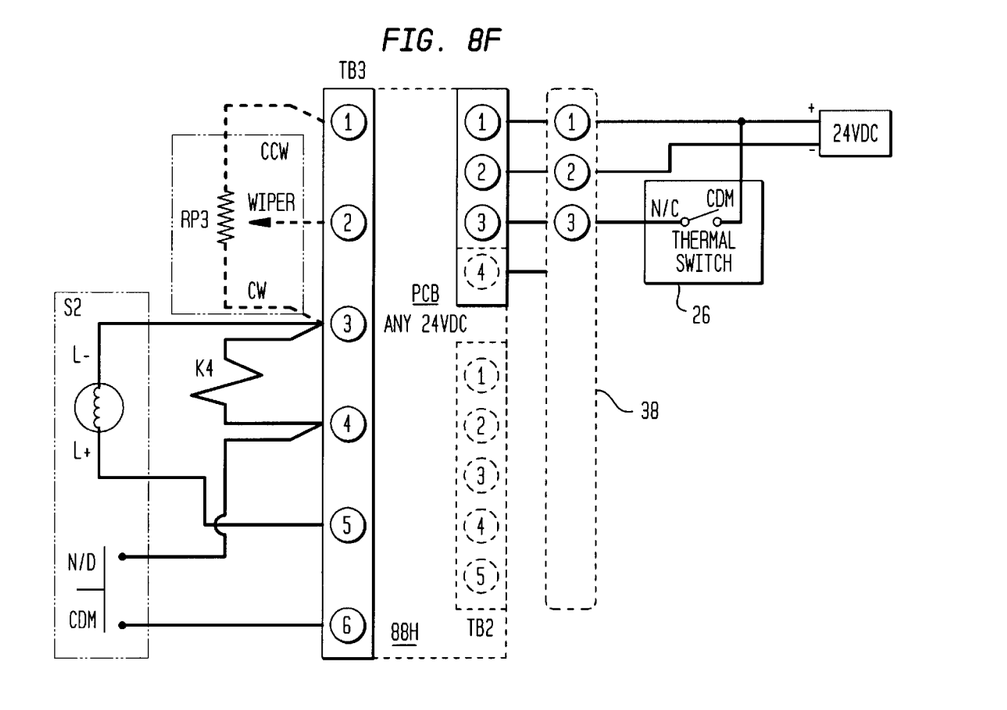

In a second embodiment, referring to FIGS. 6 and 8F, an alternate control circuit 88f on circuit board 88 is illustrated. In this embodiment, the inventive apparatus provides a selectable position indicator for identifying when the rotation of valve 10 has reached a specified threshold value. A first potentiometer 50 coupled between voltage supply Vcc and ground potential serves as an open voltage reference signal Vo. Potentiometer 50 is adjustable such that counterclockwise rotation causes a voltage decrease of reference signal Vo while clockwise rotation increases reference signal Vo. A second potentiometer 51 coupled between supply voltage Vcc and ground potential serves as a close voltage reference signal Vc. Potentiometer 51 is adjustable such that counterclockwise rotation causes a voltage increase of reference signal Vc while clockwise rotation decreases reference signal Vc. When the valve 10 is in a particular position, a voltage Vf representative of the degree of valve rotation relative to a fully open valve position is applied across wiper 25a at tb3 connector 2. Valve rotation voltage Vf is applied across buffer amplifier U1d and resistors R6 and R8 for input at positive terminals 10c and 3o of comparator circuit amplifiers U1c and U1o respectively. Close reference voltage signal Vc is applied across resistor R7 and input to the negative terminal 9c of comparator U1c. Open reference voltage signal Vo is applied to the negative terminal 2o of comparator U1a. For amplifier U1c, when the voltage at positive terminal 10c exceeds the voltage at negative terminal 9c, a positive voltage is applied at terminal 8c. Light emitting diode D1 is therefore forward biased and will illuminate, thereby indicating a "valve closed" position has been reached. The positive voltage applied at node 8c will also bias transistor Q1, causing mechanical relay switch K1 to switch from normally closed position c1–c3 to open position c1–c2, resulting in an output voltage signal Vcr applied at tb2 connector 2 for notifying a controller that a threshold indicating a close valve position has been reached. When the voltage at the positive terminal 10c is less than the voltage at negative terminal 9c of comparator U1c, LED D1 is not forward biased and therefore does not conduct. Consequently, no current is induced in coil k1a and mechanical relay switch K1 remains in normally closed position c1–c3. Therefore, no output voltage signal Vcr is applied at tb2 connector 2.

In a similar manner, when the voltage at positive terminal 3o is less than the voltage at negative terminal 2o, a ground voltage is applied at terminal 1o. Light emitting diode D2 is therefore forward biased and will illuminate, thereby indicating a "valve open" position has been reached. The ground voltage applied at node 1o will bias transistor Q2, causing mechanical relay switch K2 to switch from normally closed position c1–c3 to open position c1–c2, resulting in an output voltage signal Vor applied at tb2 connector 4 for notifying a controller that a threshold indicating an open valve position has been reached. When the voltage at the positive terminal 3o exceeds the voltage at negative terminal 2o of comparator U1o, LED D2 is reverse biased and therefore does not conduct. Consequently, no current is induced in coil k2a and mechanical relay switch K2 remains in normally closed position c1–c3. Therefore, no output voltage signal Vor indicating "valve open" is applied at tb2 connector 4. For example, if first potentiometer 50 is adjusted to provide an open reference voltage signal Vo of 3V, and second potentiometer 51 is adjusted to provide a closed reference voltage signal Vc of 16V, then rotation of handwheel 12 in a direction whereby rotation voltage Vf applied cross amplifier U1d and resistor R8 is less than 3V results in illumination of "open" LED D2 and switching of mechanical relay K2 to indicate an "open valve" position. Rotating handwheel 12 in the opposite direction whereby rotation voltage Vf applied across amplifier U1d and resistor R8 exceeds 3V extinguishes LED D2 and causes switching of mechanical relay K2 to indicate valve is not in "open valve" position. While rotation voltage Vf is between Vc and Vo, neither LED1 or LED2 are illuminated and both mechanical relay switches K1 and K2 are in their normally closed positions. Continued rotation of handwheel 12 in the opposite direction whereby rotation voltage Vf exceeds 16V causes illumination of "close" LED D1 and switching of mechanical relay K1 to indicate a "close valve" position. Circuitry 68 provides current limiting and overvoltage protection to the rest of the circuit. Note that voltage Vo is less than voltage Vc, for proper detection of open and closed valve positions. Both the locking mechanism 24 and override switch 66 function in the identical manner as previously described. In this embodiment, the inventive apparatus therefor provides indication of valve open/closed at any two preselected positions through the valve stroke, with each of the preselected positions adjustable by means of a screwdriver.

Figure 7A:
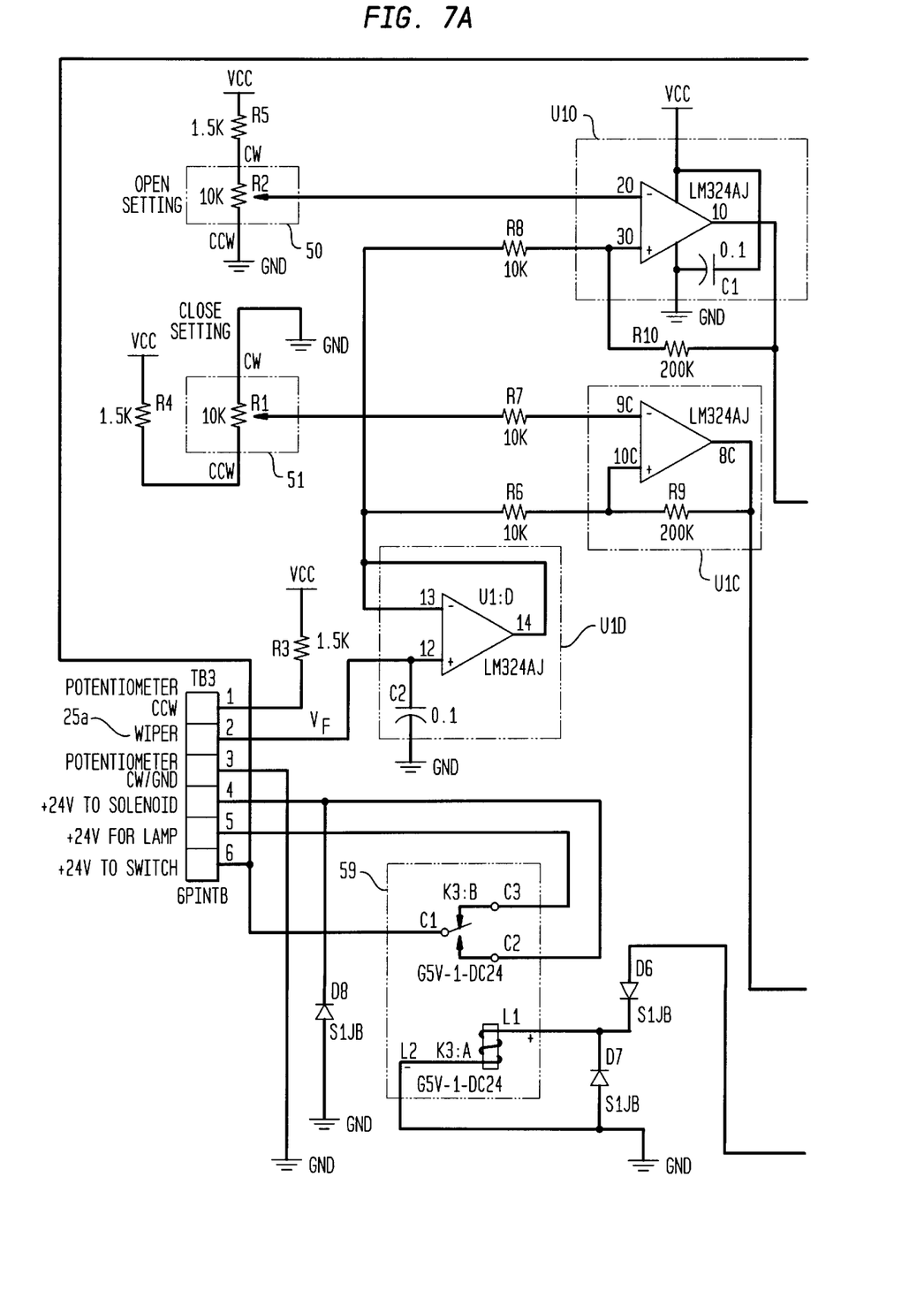
FIG. 7 is a schematic diagram of a third embodiment of a circuit formed on a circuit board.
Figure 7B:
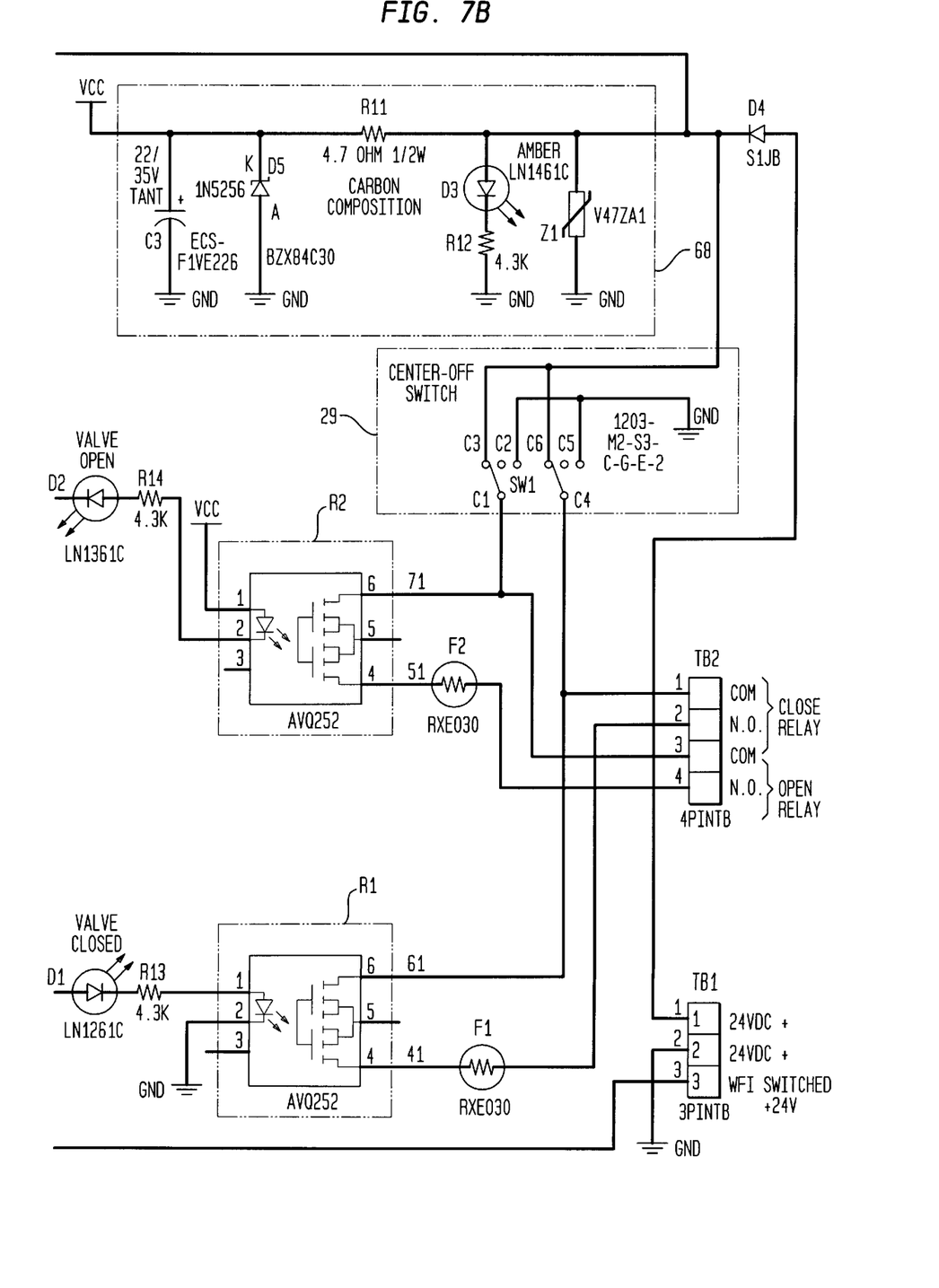

In another embodiment of the invention, illustrated in FIGS. 7 and 8D and 8E, solid state proximity switches R1 and R2 are utilized in place of mechanical relay switches K1 and K2 to indicate "open valve" and "close valve" positions. As illustrated in FIG. 7, switches R1 and R2 are optically coupled field effect transistors. Circuit operation is identical to that described in FIG. 6, except for inclusion of selector circuitry 29 for providing the option of the electric output equivalent of a PNP, NPN or 2-wire DC proximity switch outputs. Center off switch SW1 is selectable to operate in: a) first state c1–c3, c4–c6 indicative of PNP operation; b) second state c1–c2, c4–c5 indicative of NPN operation; and c) third state c1-open, c4-open indicative of 2-wire operation. When configured for PNP operation, center-off switch SW1 is coupled between c1–c3 and c4–c6 for solid state relays R2 and R1 respectively. When the voltage output at terminal 1o of comparator U1o resulting from rotation voltage Vf is less than Vo, LED D2 is forward biased, thereby energizing Relay R2. Supply voltage Vcc1 from tb1 connector 1 is applied over line 21, across diode D4 and switch c1–c3 to Relay R2 terminal 6. Because Relay R2 is forward biased, current flows from terminal 4 through solid state fuse protector F2 to tb2 connector 4, indicating to a controller that the valve is open. When Center off switch SW1 is placed in NPN operation and "open valve" threshold is indicated, current flows from tb2 connector 4 through fuse F2 into terminal 4 and out terminal 6 through c1–c2 switch to ground. Similarly, when relay R2 is placed in 2-wire operation, c1 is open so current flows from tb3 connector 3 to terminal 6, across relay R2 at terminal 4, to tb2 connector 4.

Similarly, when LED D1 is forward biased indicating "valve closed" position and PNP switch position 1 is selected for SW1, supply voltage Vcc1 from tb1 connector 1 is applied over line 21, across diode D4 and switch c6–c4 to Relay R1 terminal 6. Because Relay R1 is forward biased, current flows from terminal 4 through solid state fuse protector F1 to tb2 connector 2, indicating to a controller that the valve 10 is closed. When Center off switch SW1 is placed in NPN operation and "close valve" threshold is indicated, current flows from tb2 connector 2 through fuse F1 over line 41 into terminal 4 and output at terminal 6 over line 61 through c4–c5 switch to ground. Similarly, when relay R2 is placed in 2-wire operation and "close valve" threshold is indicated, c4 is open, thereby allowing current flow from tb2 connector 1 to terminal 6 over line 61, across relay R1 at terminal 4, to tb2 connector 2 over line 41. By providing a 3 position center off switch SW1 for selecting the electric output equivalent of a PNP, NPN, or 2-wire DC proximity switch output, one can flexibly tailor the system configuration as needed by simply switching to the desired output.

In another embodiment of the invention, illustrated in FIGS. 6 and 8G, the inventive apparatus functions as an opening stop to limit the opening of the valve 10. In this embodiment, normally closed thermal switch 26 is electrically coupled to tb2 connector 3 and to power supply Vcc over line 19. As handwheel 12 is turned toward an open position, rotation voltage Vf decreases. Open voltage threshold Vo is adjusted to a predetermined level so that mechanical relay K2 is energized, thereby interrupting current flow through relay K2 contacts c1–c3 tb2 connector 3 and tb2 connector 5, thereby de-energizing solenoid 60 and causing valve 10 to lock. This prevents further opening of valve 10, unless a manual override is performed. The opening stop is adjustable via first potentiometer 50 to provide a flexible method of limiting valve flow.

As illustrated in FIG. 8F, the inventive apparatus is adaptable to receiving either DC voltage or both DC and AC voltage and operable to transmit DC voltage output. In a preferred embodiment, optional connector sockets 38 may be used to provide good electrical connections at each of the terminals. Preferably, 4 pin or 9 pin Brad Harrison connectors may be used, to provide electrical connections. In a preferred embodiment, thermal switch 26 is in a normally closed position, as a failure therefore results in fail safe condition. However, thermal switch 26 may also be configured as illustrated in FIG. 8H as normally open.

As will be appreciated from the foregoing description, the present invention provides a practical mechanism for indicating a variety of valve positions for a manual valve.

It will be understood that a person skilled in the art may make many variations and modifications to the described embodiments utilizing functionally equivalent elements to those described. Any variations or modifications to the invention described hereinabove are intended to be included within the scope of the invention as defined by the appended claims.

What is claimed is:

1. An apparatus for providing indication of a valve position for a valve having a rotary operating assembly journaled in a housing, said operating assembly comprising a handwheel, a bushing fastened to said handwheel, and a spindle threadedly engaged to said bushing to cause translation of said spindle in response to rotation of said handwheel and said bushing, said apparatus for enclosure in said housing comprising:

a rotatable hub coupled to said bushing for transmitting rotary motion in response to rotation of said bushing;

means for translating said rotary motion into an electrical signal voltage Vf; and, circuitry means responsive to said electrical signal voltage Vf for indicating a threshold valve position, said circuitry means comprising: first potential means for generating an open signal reference voltage Vo; second potential means for generating a close signal reference voltage Vc; and, switching means responsive to said electrical signal voltage Vf for transmitting an output signal to a controller representative of the relationship among signal voltages Vf, Vc and Vo.

2. The apparatus of claim 1, wherein said switching means comprises:

first comparator means for comparing the level of said electrical signal voltage Vf with said open signal reference voltage Vo;

second comparator means for comparing the level of said electrical signal voltage Vf with said close signal reference voltage Vc;

relay means responsive to said first and second comparator means for transmitting over an output terminal an open output signal indicating an open position of said valve when Vf is less than Vo, and a close output signal indicating a closed position of said valve, when Vf exceeds Vc.

3. The apparatus of claim 2, wherein said relay means comprises a plurality of mechanical relay switches.

4. The apparatus of claim 2, wherein said relay means comprises a plurality of proximity relay switches.

5. The apparatus of claim 2, wherein said valve further includes a locking mechanism in electrical communication with said relay means and operable to prevent rotation of said valve in an open direction in response to said open output signal.

6. The apparatus of claim 4, wherein said proximity relay switches are optical-coupled field effect transistors.

7. The apparatus of claim 3, further including selection means for selecting said output signals for representation as PNP, NPN and 2-wire electronic circuits.

8. The apparatus of claim 2, further including:

a first light emitting diode disposed between said first comparator means and said relay means for illuminating when said voltage Vf is less than Vo; and a second light emitting diode disposed between said second comparator means and said relay means for illuminating when said voltage Vf is greater than Vc.

9. In combination with a fluid valve and temperature-responsive locking mechanism, an electronic position indicator apparatus, comprising:

a valve body having means formed therein for conducting fluid therethrough; wherein said body further has an opening formed therein;

means movable onto, and removable from, said opening, for obstructing and permitting fluid flow through said body, respectively, wherein said movable means comprises a flexible closure element;

a translatable spindle coupled to said element, wherein said spindle is threaded;

a rotatable, threaded bushing, wherein said spindle and bushing are threadedly engaged to cause translation of said spindle in response to rotation of said bushing;

a handwheel fastened to said bushing;

a hub coupled to said bushing for transmitting rotary motion in response to rotation of said bushing, said hub having an upper geared portion and a lower ratchet portion;

translation means coupled to said hub for translating said rotary motion into an electrical signal;

circuitry means responsive to said electrical signal for indicating position of said valve, said circuitry means comprising: first potential means for generating an open signal reference voltage Vo; second potential means for generating a close signal reference voltage Vc; said electrical signal having a voltage Vf; and, switching means responsive to said electrical signal voltage Vf for transmitting an output signal to a controller representative of the relationship among signal voltages Vf, Vc and Vo;

a platform coupled to said body;

a solenoid mounted to said platform; and, a power source coupled to a switch and to said solenoid.

10. The combination, according to claim 9, further including:

a fluid-temperature-operated electric switch coupled to said solenoid for effecting solenoid operation; and locking means, coupled to said solenoid, and in proximity to said ratchet portion of said hub, actable in response to solenoid operation, for engaging said ratchet portion and preventing rotation of said bushing.

11. The combination of claim 10, further including override means coupled to said solenoid and to said circuitry means, and actable in response to said locking means, for energizing said solenoid and permitting rotation of said bushing.

12. The combination of claim 10, further including opening stop means for limiting opening of said valve when said voltage Vf is less than said voltage Vo.

* * * * *